July 6, 1965 J. BLAKELEY 3,192,945
BUTTERFLY VALVES
Filed Oct. 26, 1961 2 Sheets-Sheet 1
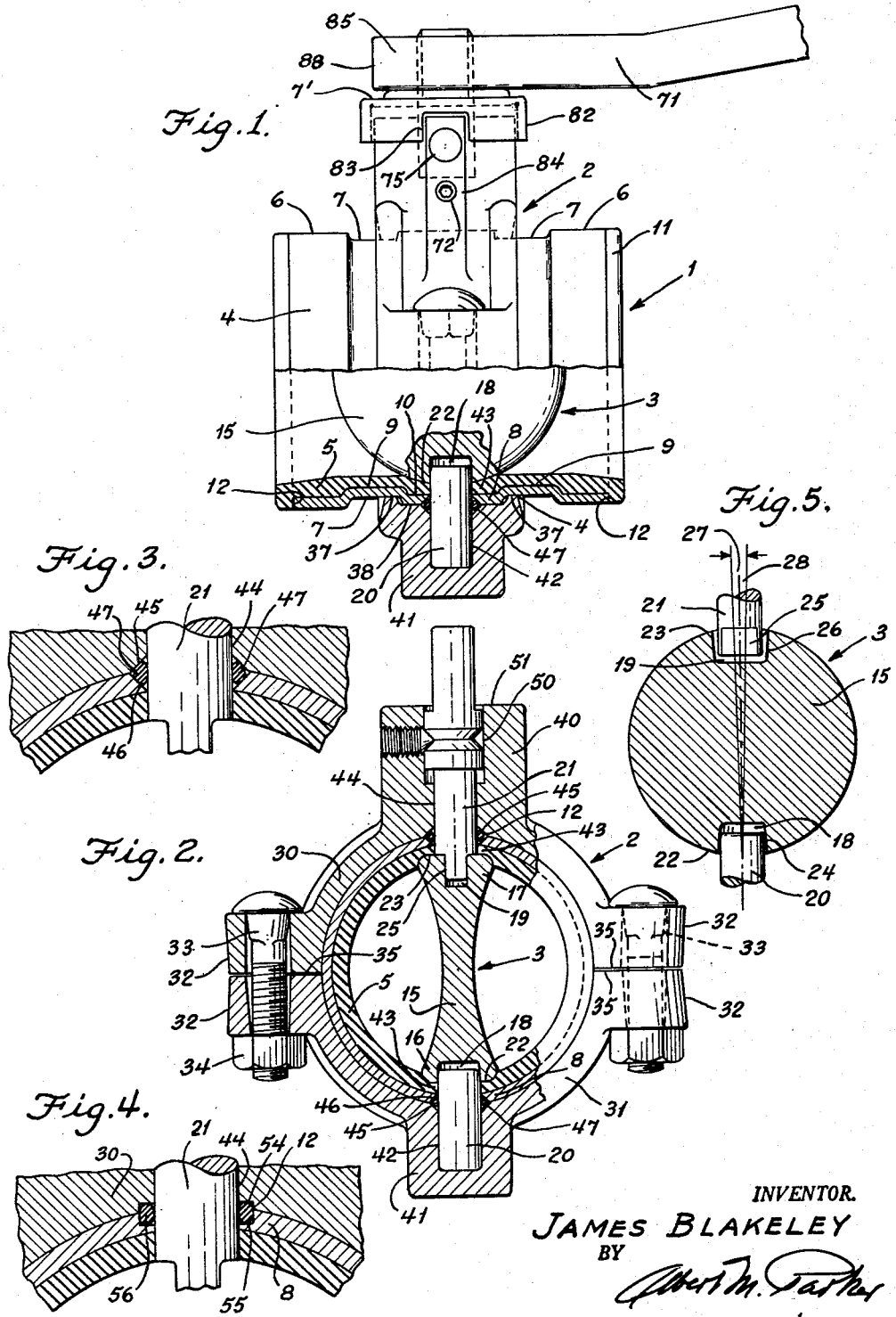
INVENTOR.
JAMES BLAKELEY
BY
ATTORNEY.

July 6, 1965
J. BLAKELEY
3,192,945
BUTTERFLY VALVES
Filed Oct. 26, 1961
2 Sheets-Sheet 2
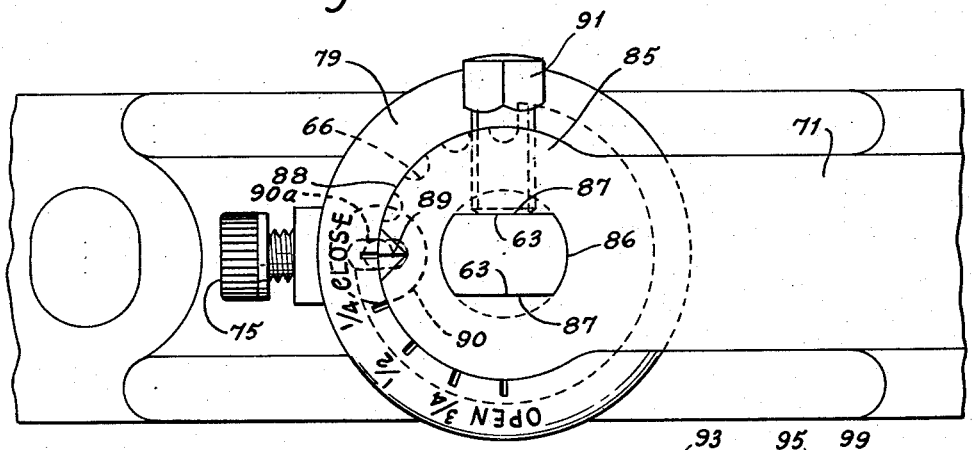
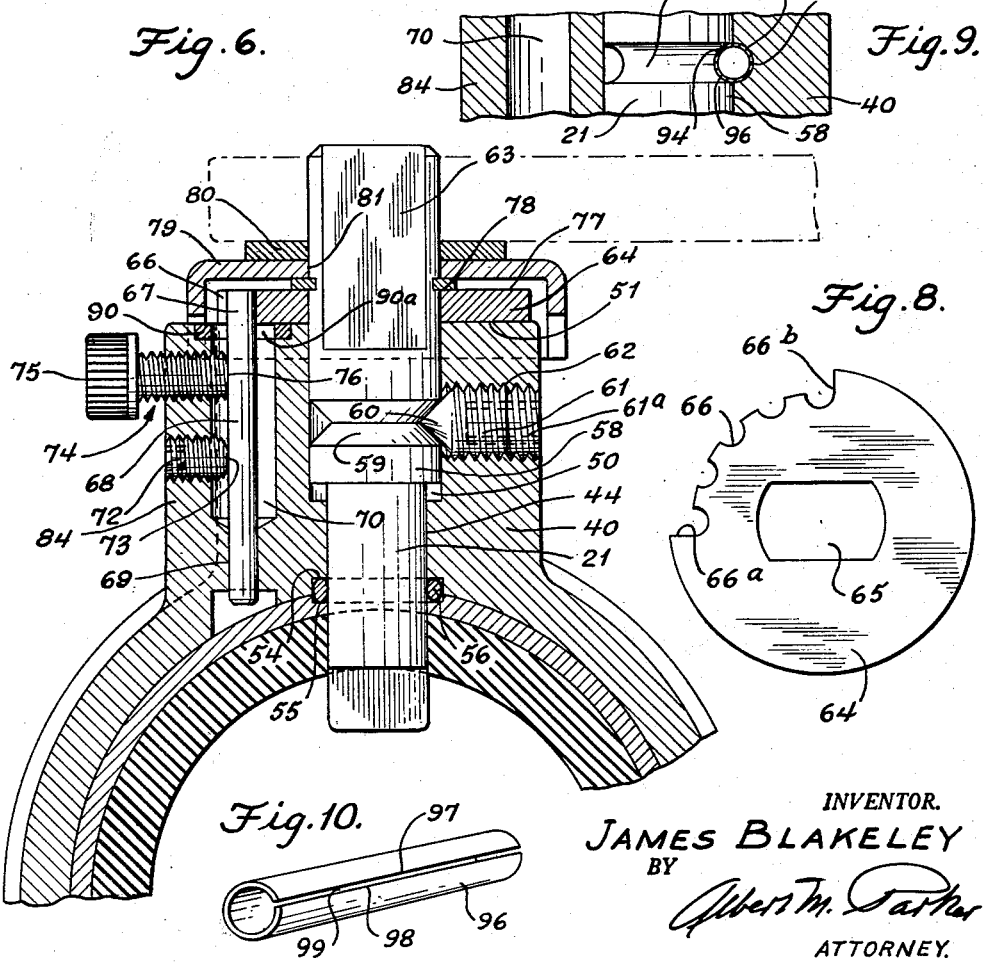
INVENTOR.
JAMES BLAKELEY
BY
Albert M. Parker
ATTORNEY.

United States Patent Office

3,192,945
Patented July 6, 1965

3,192,945
BUTTERFLY VALVES
James Blakeley, Markham Township, Ontario, Canada, assignor to Victaulic Company of America, Union, N.J., a corporation of New Jersey
Filed Oct. 26, 1961, Ser. No. 147,782
15 Claims. (Cl. 137—375)

This invention relates to butterfly valves and is particularly concerned with such valves having a disc like flow controlling or stopping member, a floating mounting therefor and the housing and actuating means for the valve.

In the makeup of the embodiment of the valve body of the invention to be considered here, a section of standard thin walled pipe is used. This section of pipe as illustrated is lined to protect it against corrosion and erosion. This pipe section may be made of carbon steel, stainless steel, aluminum, brass or other material suited to the particular need. The lining, of a resilient rubber-like or plastic material, is molded within the section of pipe. The pipe section is also formed to provide for the effective reception of coupling housings so that the valve may be coupled into a pipe line. Additionally, the pipe formations for effecting the coupling also serve to key and help secure the lining and valve seating material in place within the pipe to restrain that lining against slippage, by resisting actions tending to cause slippage.

The forming of thin wall pipe by roll grooving to receive the key sections of coupling housings on the outside and to key the liner in place on the inside also provides a formation to interfit with the housing carrying the valve stems and actuating mechanism. By this interfitting the pipe and housing strengthen each other to resist any movement of one with respect to the other when a thrust load is imposed upon the valve disc. The stems carried by the housing and on which the valve disc is mounted necessarily extend through the pipe and the lining thereof and could readily create a leakage path therethrough. However, the assembly and securement together of the housings and the pipe, with their related formations, enable effective sealing against leakage to be achieved about the stems.

The valve housing of the invention is formed to be clamped onto the pipe section forming the valve body. It is accordingly of simple construction and can be economically manufactured by being cast from such materials as malleable iron, aluminum, stainless steel, brass, or other metal to suit the requirements of the particular service. Machining of the housing is kept at a minimum.

The valve or closure disc is formed for mounting on upper and lower stems in a manner to provide a certain amount of floating action of the disc with respect to its seat and the stems. In this way the disc is self-centering on its seat to provide and maintain maximum sealing effect. By this manner of sealing machining of valve parts is again kept at a minimum. Thus, not only is the construction of the disc, its mounting and the housing for the same maintained at an economical level, but valve operation is improved upon due to the elimination of the accumulation of errors incurred by machine tolerances of machined parts.

The handle for actuating the valve disc acts upon the upper mounting stem. In conjunction with this actuation the housing provides for indexing and indicating the position of the valve for holding the same in place, or for locking it in place as desired. Provision is also included for adjusting the tension on the holding means. There is also provision for protecting the working mechanism of the valve from dust and other foreign material.

The principal object of the invention is to provide simple and economical butterfly valve assemblies including provision for self centering of the valve disc.

Another object is to provide for such self centering in a resilient manner.

Another object is to provide such assemblies which can be readily assembled and disassembled.

Another object is to provide for the ready coupling of the valve assembly into a pipe line.

Another object is to provide for the effective retention of liner within the section of pipe to which the valve is applied.

Still another object is to provide for the contouring of the pipe section forming the valve body for coupling into a pipe line and for seating the valve housing thereon to also serve for the retention of the liner in the valve body.

A further object is to provide for cooperation between the valve housing and the pipe section of the valve body so that they strengthen each other.

A further important object is to provide cooperation between the housing, valve body and disc mounting stems for the prevention of leakage about such stems.

A still further object is to make effective provision for the positioning and locating of the valve disc within the valve body.

A still further object is to provide for locking of the valve disc in desired position.

Further and more detailed objects of the invention will in part be obvious and in part be pointed as the description of the invention taken in conjunction with the accompanying drawing proceeds.

In that drawing:

FIG. 1 is a part elevational, part sectional view of a complete valve assembly in accordance with the invention, showing the valve in open position.

FIG. 2 is a transverse vertical sectional view through the assembly of FIG. 1 with a fragment of such assembly being shown in end elevation.

FIG. 3 is an enlarged fragmentary sectional view showing one manner of sealing about the upper stem where it passes out through the wall of the assembly.

FIGURE 4 is a similar view showing a modified form of sealing.

FIG. 5 is a vertical sectional view of the valve disc and mounting stems per se taken at right angles to the showing of FIG. 2.

FIG. 6 is an enlarged vertical sectional view of the upper portion of the valve housing showing the detail of the upper actuating stem and the indexing and locking means for the valve.

FIG. 7 is an enlarged fragmentary top plan view of the valve assembly with the handle in place in closed position and showing the indexing indicia.

FIG. 8 is a plan view of the indexing and locking disc per se.

FIG. 9 is a fragmentary sectional view of modified upper stem position means; and FIG. 10 is a perspective view of the positioning pin of FIG. 9.

Basically the valve assembly of the invention is made up of a body generally indicated at 1, a housing 2 carrying the valve disc and actuating mechanism, and the disc itself, 3.

The body 1 in the embodiment here illustrated is principally composed of a section of thin pipe 4, thin enough to be grooved by rolling, and provided with a liner 5. Sections of the normal diameter of the pipe are left at 6 at the ends of the body 1 to provide exterior seating surfaces to seat the gaskets of the coupling housings employed for coupling the body into a pipe line. The type of coupling here contemplated is generally in accordance with that disclosed in the Tribe Patent #1,541,601. Inwardly from the end section 6 the pipe material is rolled radially inwardly to form the annular grooves 7. The grooves 7 are spaced apart and bordered on their sides away from the pipe ends by a cylindrical portion 8 of the initial pipe diameter. The grooves 7 are not only of sufficient width to receive the key sections of the coupling housings used for coupling the ends of the body to pipes, but, in addition, they have sufficient width to accommodate the key sections of the valve housing as will be pointed out in more detail hereinafter.

Besides being advantageous for the securing of exterior elements to the body, the grooves 7 and the section 8 also assist in securing the pipe lining and valve seat forming material 5 in place within the body. This is due to the internally extending annular ribs 9 forming the bases of the grooves 7, between which ribs a projecting rib 10 of the lining material seats in the outwardly extending groove in back of the section 8. The projecting rib 10 is at the important position where the seating of the valve takes place. Thus the grooved pipe and the lining, as advantageously assembled here, both perform dual functions.

Besides being restrained against longitudinal slippage by means of the projections 9 of the pipe and its own projection 10 the lining is, of course, adhered to the interior of the pipe throughout. Furthermore, the lining is flanged outwardly at 11 to overlie the ends 12 of the pipe. Thus none of the metal of the pipe is exposed to fluid passing through the pipe which might otherwise tend to corrode or erode it.

The lining 5 is preferably formed of a tough resilient plastic or rubber like material. It is preferably selected for resistance to the particular action inherent in the material to flow through the body. Besides serving to protect the ends 12 of the pipe from erosion, or corrosion, the flanged ends 11 of the lining may serve to engage with the ends of an adjacent pipe, or a lining similarly exposed at the ends of an adjacent pipe, so as to provide a leak proof joint between those linings regardless of the coupling gasket employed.

Considering now the valve disc 3 itself, it will be seen to have a circular outline when viewed in the flat and, generally speaking, its body portion 15 has transversely rounded peripheral edges and increases in thickness from those edges towards the center thereof. There is a departure from this general arrangement at the opposite ends of the vertical axis of the disc. Here the disc is enlarged at 16 and 17 to provide adequate sockets 18 and 19 for reception of the inner ends of the mounting stems 20 and 21. The engagement of the stems 20 and 21 in the sockets 18 and 19 and the reception of the peripheral turning and seating portions 22 and 23 of the disc adjacent those sockets by the resilient lining 5 of the valve body impart a floating, or self centering characteristic to the valve disc. This is an important feature of the invention.

As regards the relationship between the stem 20 and the socket 18 it will be apparent from the showing in FIG. 5 that here there is only a small departure from a normal cylindrical relationship. Such departure as there is resides in the side wall 24 of the socket 18 diverging slightly conically towards the open mouth of the socket. This allows for a rocking movement of the disc about the stem 20 to the extent provided for by the inter-relationship of the socket 19 and its stem 21. From FIG. 2, however, it will be noted that the stem 21 has a pair of flats 25 adjacent its end which snugly fit the socket 19. Viewing the disc 3 and stem 21 at right angles to the FIG. 2 showing, it will be seen that the socket 19 is elongated in this direction with its ends 26 being substantially further apart than the width of the stem 21. The space provided here allows the disc 3 to rock in the plane of the disc as viewed in FIG. 5 about the stem 20 as a pivot and about its vertical axis 27 to the extent of a small angle 28 to either side of that axis.

The rocking, or floating, action of the valve member 3 enables its seating portions 22 and 23 to seat themselves effectively into the resilient lining 5. The lining material is resilient and yieldable so any rocking or floating of the valve to enable effective seating to be achieved at any position about the periphery is provided for at these end mountings. Thus highly effective valving action is achieved in spite of the fact that the valve disc may be made as a casting with the sockets 18 and 19 cast therein, thereby keeping machining down to a minimum.

The housing 2 for mounting the elements just described, as well as for the operable mounting and indexing of the handle, is made of two half housings 30 and 31, each generally forming half of a section of circular cylinder. Each of these half sections is provided with a pair of outwardly extending bolt pads 32 adjacent its ends to receive bolts 33. The bolts 33 extend through the pads and carry nuts 34 on their outer ends which engage the outer surfaces of one pair of the bolt pads. The inner surfaces 35 of the bolt pads lie in radial planes extending across the ends of the semi-circular portions. Thus by tightening the nuts 34 the bolt pads 33 may be brought toward each other to clamp the valve body within the body of the housing and this is continued until the surfaces 35 are brought into contact.

Referring now to the showing in the lower part of FIG. 1, it will be seen that the half housing 31 has identical upstanding locating keys 37. These are in the form of radially inwardly extending semi-annular ribs which, as shown, are seated in the grooves 7 at the sides thereof innermost from the ends 12 of the pipe section. Between the ribs 37 the housing is channeled at 38 to receive the unrecessed portion 8 of the pipe. The upper half housing 30 is similarly channeled and formed with keys, or ribs, similarly engaged in the grooves 7. It will thus be apparent that a strong and effective assembly of the housing and body can be effected by the structure described and merely by the appropriate tightening of the nuts 34. The necessity for machining of the housing is minimized inasmuch as the adjustment of the housing to the body is readily achieved by appropriate tightening of the nuts 34. Nevertheless the housing and body are so inter-related that they form together a strong mounting for the valve disc regardless of the pressures exerted upon it.

With the keys or ribs seating in the grooves 7 and the portion 8 of the pipe seated within the channel 38 formed in the housing section 31, a strong interlock is provided between the housing and the valve body 1. The same relationships exist between the upper housing 30 and the upper half of the body. Thus when the housings are clamped together encircling the body a strong rigid inter-relationship of housing and body is achieved.

Each of the housing sections 30 and 31 is provided intermediate its ends with a radially outwardly extending projection. The projection 40 extending from the half housing 30 is generally cylindrical in outline and is of larger diameter and greater radial extent than the projection 41 extending from the housing 31. First, and foremost, these projections provide the mounting means for the stems on which the valve diaphragm is pivoted. Thus the projection 41 is recessed at 42 to snugly receive the lower stem 20. This stem 20 fills the recess 42 and extends radially inwardly therefrom through the wall of the housing, through the portion 8 of the wall of the pipe body, through the seating and lining portion 43 of the liner and terminates in the socket 18 of the valve disc 3 as previously pointed out.

In spite of the tight contact made by the bearing portion 22 of the valve disc with the liner portion 43, at the turning position, there is nevertheless the likelihood, considering the pressures existing in the pipe lines for which this valve is designed, of leakage getting past this contact to reach the stem 20 and run down along its side. As regards the stem 20 this could not go anywhere inasmuch as the socket 42 is closed, but it could come in contact with the metal of the pipe where the stem 20 passes through it and in contact with the metal wall of the bore 42. The problem then is to prevent this without at the same time complicating the construction. This is readily achieved in accordance with the invention by the use of an "O" ring and the confinement thereof about the stem 20. An identical arrangement is employed about the stem 21. Also it is of more importance here for if fluid passed the O ring around the stem 21 it could leak right out. This important aspect of the invention applicable at both positions will now be described in detail.

Where the stems 20 and 21 pass out from their respective housings in the direction of the valve disc 3, those housings are recessed conically at the mouths of the stem sockets 42 and 44, as the case may be. Such recesses are indicated at 45 in both positions in FIG. 2. The opening through the pipe portion 8 at this position is formed with a conical surface 46 extending in opposed direction with respect to the surface 45. Thus the opposed conical surfaces 45 and 46 and the sides of the stem 42 and 44, as the case may be, form recesses triangular in cross section. These recesses receive resilient O rings 47 so designed with respect to the sizes of the recesses that when the clamping of the housings about the pipe is properly effected the O rings will be deformed and forced against all of the sides of the recess in a manner to prevent any leakage past this point.

The greater significance of this O ring seal with respect to the stem 21 is due to the fact that the stem 21 is made to turn and to rotate the valve disc throughout its range. Furthermore, the bore 44 receiving the valve stem 21 opens out at its upper end into an enlarged bore portion 50 opening through the top surface 51 of the projection 40. Thus any leakage would be undersirable and, if of corrosive or other active fluid, would be destructive and dangerous. However, the clamping of the housings and the design of the O ring seals is such as to enable the stem 21 to be readily turned while at the same time preventing any possibility of leakage up between the stem 21 and its bore 44.

A modified, but highly effective form of O ring design usable about either of the stems 20 and 21 is illustrated in FIG. 4. Here the housing section 30 is shown as being formed with a right angled recess 54 at the mouth of the bore 44. The passage through the metal part 8 of the pipe has its outer portion correspondingly enlarged into a right angled annular recess 55. These recesses 54 and 55 mate together to provide an overall rectangular annular recess around the stem 21. An O ring 56 is seated in this recess and is deformed against the side of the stem 21 to again form a tight leak and pressure proof seal against possible leakage of the contents of the valve cut past the stem. The same alternate O ring construction is of course contemplated for use about the stem 20.

The structure for actuating the valve will now be described with particular reference to FIGS. 6-8. As previously pointed out, in the upward extension of the bore 44 it opens out into an enlargement 50 which then continues throughout the remainder of the height of the projection 40. The stem 21 is enlarged at 58 into a portion which makes a rotatable fit within the enlarged bore 50. This enlarged portion 58 is first formed with an annular recess 59 therein, V shaped in cross-section of the reception of a complementary shaped nose 60 on the set screw 61. This set screw is threadedly received at 62 in the side of the projection 40 and serves to maintain the stem in its bore and in the desired vertical position therein. It is locked in place by a lock screw 61a. Above the recess 59 the enlarged portion 58 of the stem continues in cylindrical form until close to the upper surface 51 of the projection. Then it departs from the cylindrical into an elongated key portion whose sides are formed into a pair of parallel opposed flats 63.

An indexing plate 64 having an opening 65 formed to mate with the key portion of the stem 21 is mounted over that stem and seats rotatably on the top surface 51 of the projection 40. This plate 64 being keyed to the stem 21 coacts with other instrumentalities to cause the valve disc to either be resiliently held or positively locked in desired position, as the case may be. For this purpose the otherwise circular periphery of the plate 64 is formed with a series of spaced recesses 66 extendeng thereinto between radial stop shoulders 66a and 66b. The recesses 66 are evenly spaced between the stops 66a and 66b which latter are on radii one-quarter of a circumference apart. The stops 66a and 66b determine the extremes between fully open and fully closed position of the valve. Besides the recesses at these extreme positions there are three others evenly spaced inbetween so that the valve can be opened to one-quarter, one-half, and three-quarter positions and indexed there. This number of positions is, of course, purely for the purpose of illustration as a greater, or smaller, number of positions may be provided as desired.

Turning now to the left hand side of FIG. 6, it will be seen that one of the recesses 66 of the disc like indexing plate 64 here shown has the upper end 67 of a pin 68 received therein. This pin is a resilient metal member, which is secured at 69 in the lower part of the projection 40. From there the pin 68 passes up through an enlarged vertical bore 70. At the mouth of the bore 70 an enlarged seat is provided for a guide plate 90. This plate has an elongated opening 90a therein only slightly wider than the diameter of the pin 68 to guide that pin in its radial movement. The indexing plate 64 partly overlies the guide plate 90 and the pin 68 extends past the guide plate 90 so that its upper portion 67 seats in the appropriate one of the recesses 66 in the indexing plate 64. The resiliency of the pin enables it to spring from one of the recesses 66 into the next when sufficient turning force is exerted on the stem 21 by means of the handle 71 shown in FIG. 7. The maintenance of correct tension on the pin is controlled by the position of a set screw 72 which is seated in the side of the projection 40 and extends part way through the bore 70 into engagement with the side of the pin as indicated at 72.

In the event that it is desired to lock the valve in any particular position, this is achieved by means of the screw 74 extending through the wall of the projection 40 above the position of the set screw 72. The lock screw 74 has a knurled head 75 by means of which it may be turned so that its innermost end 76 engages with the pin not far below the indexing end 67 thereof. The locked position of the screw 74 is illustrated in FIG. 6 and from which showing it is obvious that, positioned as it is, the lock screw 74 prevents the pin from springing out of the recess 66. The valve is, accordingly, locked in desired position.

The upper surface 77 of the indexing plate 64 is engaged by a split washer 78 which in turn is recessed into the upper key part of the stem 20, thus holding the disc 64 from riding up on the stem and from riding up with respect to the pin 68. A cap member 79 seats down on top of the washer 78 and is held downwardly by means of a plastic washer 80, which tightly engages the upwardly extending portion of the stem 21. The cap 79 has a circular opening 81 therethrough of the same diameter as the enlarged portion 58 of the stem 21. Thus the cap 79 is not caused to rotate with the stem. Instead, as seen by reference to FIG. 1, the downturned skirt 82 of the cap 79 is recessed upwardly at 83 to embrace the radially extending rib 84 of the projection 40, this being the rib through which the screws 74 and 72 extend. The cap 79 is, accordingly, held from rotating.

As will be appreciated from the FIG. 6 showing, the cap 79 covers the upper stem of the valve and the indexing mechanism in a manner to prevent dirt and other foreign matter from getting thereinto. It also functions, however, to carry indicia showing the position of the valve.

In the first place, the handle 71 for turning the valve has an enlarged head 85 formed with an opening 86 having flats 87 at opposite sides. This opening is formed to interfit with the upper end of the stem 21, with the flats 87 engaging the flats 63. Thus turning of the handle 71 will turn the stem 21 and thus the valve disc 3. The end of the head 85 remote from the handle 71 is rounded as shown at 88 and carries an indicating line 89 thereon in alignment with the longitudinal extent of the handle 71. This line extends to the rounded edge 88 where it can be lined up with indicating marks carried on the upper surface of the cap 79.

The indicating markings showing the valve position are formed on the upper surface of the cap 79 where the same is exposed beyond the rounded head 85. As here shown, five indicating markings are employed. That in alignment with the handle when it is in position to have the valve closed is merely indicated by the word "close." Then openings in turns of one-quarter movement are indicated by the one-quarter, one-half and three-quarter marks, while the fully open position is merely indicated by the word "open." The marks here are, of course, the same in number and spaced in the same manner as the recesses 66 in the indexing plate 64. Thus the extent of opening provided by that plate, whether it be in quarters, or some other fraction, will be shown in this manner.

A suitable clamping bolt for securing the handle in place on the stem 21 is shown at 91. This extends through one side of the handle head 85 and engages one of the flats 63.

It is believed that the operation of the valve of the invention will be readily apparent from the foregoing description of the construction thereof. To mention just a few points, it is to be appreciated that the seating of the valve disc 3 about its pivoted positions, such as 22 and 23, is resilient due to the resiliency of the material of the lining 5. When it is closed, the valve disc 3 seats against the same resilient material all around its periphery. For enhancing the effectiveness of this seating the disc is mounted to float to a certain extent within the plane of its circle, as seen in FIG. 5, by the fact that its socket 19 is wider than the diameter of the stem 21 while the socket 18 seats on the stem 20 in such a manner as to have a small rocking movement thereon. Hence if the valve, while being turned to closed position, is seated on one side more than the other as it reaches that position, it will automatically float sidewise to a sufficient extent to provide uniform seating throughout the periphery thereof.

With regard to the indexing and indicating means, it will be appreciated that when sufficient turning force is applied to the valve to cause the resilient pin 68 to snap out of one recess 66 and into the next, or subsequent one, as desired, the valve will be held strongly in that position against any effort to dislodge it. Further than this, if it is desired to positively lock the valve against turning this can be done by preventing the spring action of the pin 68 through tightening up on the locking screw 74.

A somewhat modified manner of holding the stem 21 in place in the projection 40 is illustrated in FIGS. 9 and 10. Here the enlarged portion 58 of the stem 21 is provided with annular groove 93 semi-circular in cross section whose base 94 mates with a bore 95 extending transversely of the projection 40 to provide a passage for the reception of a spring dowel pin 96.

The dowel pin 96, as best seen in FIG. 10, is formed as substantially a cylinder of spring steel. In relaxed position the cylindrical wall of this pin is not quite complete inasmuch as the longitudinal edges 97 and 98 thereof leave a gap 99 between them. The relaxed position is the one to which the spring dowel pin 10 tends to return due to the resiliency of the material, even though the pin must force into an opening of a size requiring the gap 99 to be completely closed.

Reverting again to FIG. 9, it will be seen that this is an instance where the gap 99 is closed inasmuch as the bore receiving the pin is of a size to require such closing. However, the tendency of the pin to return to the FIG. 10 position will cause it to lock itself in the bore and prevent any movement of it longitudinally in spite of the turning of the stem 21. Introducing and removal of the pin when desired can be effected by driving it in or out as the case may be, inasmuch as the bore, which is completely cylindrical throughout most of its extent, opens out through the wall of the projection 40 at its extremities.

Considering the overall arrangement, it is a relatively simple one having regard to the improvements that it introduces into the art. Machining, one of the big expenses of most valves, is substantially done away with. Nevertheless, a strong effective construction which can be readily assembled and disassembled is provided. Various elements perform dual functions and the coupling of the valve into a pipeline or into other forms of conduit is provided for in simple straightforward manner.

Though particular structural elements and relationships of them have been shown in the accompanying drawing and described in the foregoing description, it is of course to be understood that this is for the purpose of setting forth the presently preferred embodiment of the invention. Such showing and description are not to be taken in a limiting sense, for it is appreciated that those skilled in the art may well devise alternatives of, or substitutes for, the various elements and relationships of the valve of the invention without departing from the spirit and scope of the invention.

Speaking more generally, since certain changes may be made in the above construction and different embodiments of the invention could be made without departing from the scope thereof, it is intended that all matter contained in the above description or shown in the accompanying drawing shall be interpreted as illustrative and not in a limiting sense.

I claim:

1. In valve mechanism for controlling the flow of fluids, a valve disc, means positioned at opposite ends of a diameter of said disc for mounting said valve disc for rotatable movement about a diameter thereof extending substantially through the center thereof and means included in said mounting means for providing free floating movement of said valve disc in the plane thereof for the centering of the same with respect to a valve seat.

2. Valve mechanism as in claim 1, said means providing free floating movement including coacting recess and stem means, one of said recess means being elongated in one direction with respect to the greatest dimension of said stem means for said recess means in said direction, said valve seat being annular and said valve disc seating around the periphery of the valve seat.

3. Valve mechanism as in claim 1, said mounting means including coacting pairs of stem and recess means, one pair of said recess and stem means having a concentric interrelationship, the other pair of said recess and stem means including parallel opposed flats on said stem means and said recess means being formed as an elongated slot having parallel sides for slidable mated engagement with said flats, the depth of said slot being greater than the extent of penetration of said stem means into said slot.

4. Valve mechanism as in claim 1, said mounting means including recesses formed into the edge of said disc at diametrically opposed positions thereon, one of said recesses having a wall extending slightly conically and enlarging outwardly toward the opening thereof at the edge of said disc and first substantially cylindrical stem means being formed to be receivable in said one recess for restricted rocking movement between an edge of said stem means and said conical wall of said recess, the other of said recesses having a pair of parallel side walls extending in the same direction as the plane of said disc, and second stem means formed with a pair of opposed flats thereon engageable with said side walls for rotating said disc, said flats on said second stem being slidable with respect to said side walls of said recess and said side walls of said recess being elongated with respect to the greatest diameter of said stem whereby free rocking movement of said disc in the plane thereof is provided.

5. In valve mechanism for controlling the flow of fluids, a valve body, a valve disc seated therein for controlling the flow of fluid therethrough, resilient lining means for said valve body, means positioned at opposite ends of a diameter of said disc for pivotally mounting said valve disc about a diameter through the center thereof within said valve body for seating engagement with said resilient lining, said mounting means including means providing a free floating movement of restricted extent of said valve disc with respect to said mounting means whereby the periphery of said valve disc may effectively seat itself against said resilient lining.

6. Valve mechanism for controlling the flow of fluids including a valve body in the form of a section of pipe, said pipe being formed with a pair of spaced grooves extending thereinto, said pair of grooves leaving a section of pipe between the same of normal pipe diameter, a valve housing formed as a pair of mated hemi-cylindrical segments, means for clamping said segments together, said housing being formed interiorly with an annular channel and said channel being bordered by radially inwardly extending annular key sections, the base of said channel when said cylindrical sections are clamped together being formed to embrace said section of said pipe between said grooves and said key sections being formed to engage portions of said grooves, said housing being clamped in position over said body, a disc-like valve member within said body and interengaging means extending between said housing and said valve member for mounting said valve member in place in said body.

7. Valve mechanism is in claim 6, said body being formed within a resilient liner secured therewithin, the material of said body in back of said grooves forming annular projections extending radially inwardly of said body, said projections seating in said resilient material to assist in maintaining the same in position within said body.

8. Valve mechanism as in claim 7, said grooves having free portions extending towards the ends of said body from said key sections for the reception of the key sections of coupling housings therein, there being portions of said body of the normal diameter of said section of pipe extending from said grooves to the ends of said body and providing smooth exterior gasket engaging surfaces, whereby said body may be coupled to adjacent pipes by means of clamp type couplings.

9. In a valve body and housing assembly providing a passage for the flow of fluids therethrough, a disc-like valve member seated in said passage and formed for controlling the flow of fluid therethrough, diametrically opposed radially outwardly extending projections carried by said housing, stem means seated in said projections projecting radially inwardly with respect thereto and engaged with said valve member for the rotatable mounting of the same, one of said stem means extending radially outwardly through the outer end of one of said projections, means carried by said one of said projections and operatively engaged with said stem means for providing resilient resistance against the turning of said one of said stem means, said resilient resistance providing means including an indexing disc keyed to said stem means and a resilient pin mounted in said one projection, said indexing disc being formed with recesses in the periphery thereof and said pin having a free end positioned for selective engagement with said recesses, said one projection being formed with a bore receiving said pin and of substantially greater diameter than the diameter of said pin providing for substantial lateral movement of said pin, the lower end of said pin being seated in the material of said one projection below said bore, and means seated in the wall of said one projection and extendable into said bore and adjustable from the outer surface of said one projection for engagement with said pin for controlling the resilient action thereof.

10. In a valve body and housing assembly providing a passage for the flow of fluids therethrough, a disc-like valve member seated in said passage and formed for controlling the flow of fluid therethrough, diametrically opposed radially outwardly extending projections carried by said housing, stem means seated in said projections projecting radially inwardly with respect thereto and engaged with said valve member for the rotatable mounting of the same, one of said stem means extending radially outwardly through the outer end of one of said projections, means carried by said one of said projections and operatively engaged with said stem means for providing resilient resistance against the turning of said one of said stem means, said resilient resistance providing means including an indexing disc keyed to said stem means and a resilient pin mounted in said one projection, said indexing disc being formed with recesses in the periphery thereof and said pin having a free end positioned for selective engagement with said recesses, said one projection being formed with a bore receiving said pin and of substantially greater diameter than the diameter of said pin providing for substantial lateral movement of said pin, the lower end of said pin being seated in the material of said one projection below said bore, and means seated in the wall of said one projection adjacent the upper end thereof and formed for engagement with said pin for locking said pin against the resilient action thereof.

11. In a valve body and housing assembly providing a passage for the flow of fluids therethrough, a disc-like valve member seated in said passage and formed for controlling the flow of fluid therethrough, diametrically opposed radially outwardly extending projections carried by said housing, stem means seated in said projections projecting radially inwardly with respect thereto and engaged with said valve member for the rotatable mounting of the same, one of said stem means extending radially outwardly through the outer end of one of said projections, means carried by said one of said projections and operatively engaged with said stem means for providing resilient resistance against the turning of said one of said stem means, said resilient resistance providing means including an indexing disc keyed to said stem means and a resilient pin mounted in said one projection, said indexing disc being formed with recesses in the periphery thereof and said pin having a free end positioned for selective engagement with said recesses, said upper stem extending upwardly above the upper end of said one projection, an inverted cup-like cover member overlying said upper end, said cover member being formed with a recess therein overlying said upper stem and formed for relative rotation with respect thereto, means carried by said cover member and engageable with said one projection for preventing rotation of said cover member, a valve handle secured to said upper stem above said cover member and keyed to said stem to rotate the same, indicia formed on the upper surface of said cover member indicating the relative position of said valve disc in said body and indicating means carried by said valve handle for alignment with said indicia for setting the position of said valve.

12. In a valve body and housing assembly providing a passage for the flow of fluids therethrough, a disc-like valve member seated in said passage and formed for controlling the flow of fluid therethrough, diametrically opposed radially outwardly extending projections carried by said housing, stem means seated in said projections projecting radially inwardly with respect thereto and engaged with said valve member for the rotatable mounting of the same, one of said stem means extending radially outwardly through the outer end of one of said projections, means for turning said one of said stem means for turning the same to turn said valve member, an indexing plate mounted on said one of said stem means for rotation therewith, said one projection being formed with a bore therein extending in parallel relationship with respect to said one stem means and opening out at the upper end of said one projection at a position adjacent said indexing plate, said indexing plate being formed with indexing recesses therein, a pin mounted in said bore, extending outwardly above the same and having an upper end engaging one of said indexing recesses, said pin being resiliently disengagable from said indexing recess on the application of sufficient turning force through said turning means.

13. In a valve body and housing assembly as in claim 12, a cap member covering said indexing plate and said upper end of said pin, said cap member having a disc like top overlying said plate and a downwardly extending skirt therearound, said disc-like top being formed with a central opening therethrough, said one stem extending through said opening and being freely rotatable with respect to said cap, said skirt overlying a portion of said one stem and said skirt and said one stem being formed with interengaging means for preventing the rotation of said cap with respect to said one stem.

14. Valve mechanism for controlling the flow of fluids including a valve body in the form of a section of pipe, said pipe at spaced longitudinal positions being formed with first elements of engaging means therearound, the portion of said pipe section between said first elements being of normal pipe diameter, a valve housing formed as a pair of mated hemicyclindrical segments, means for clamping said segments together, said housing being formed interiorly with an annular channel, and said housing, at the sides of said channel, being formed with second elements of engaging means, formed to engage with said first elements to position said housing longitudinally with respect to said pipe, said housing being clamped in position over said body with the base of said channel embracing said pipe section between said engaging means, a disc-like valve member within said body and interengaging means extending between said housing and said valve member for mounting said valve member in place in said body.

15. Valve mechanism as in claim 14, said engaging elements including parts extending generally radially away from the normal contours of said pipe section and said housing.

References Cited by the Examiner
UNITED STATES PATENTS

| | | | |
|---|---|---|---|
| 1,417,808 | 5/22 | Dewey | 251—304 XR |
| 1,746,055 | 2/30 | Roberts | 251—285 XR |
| 2,634,946 | 4/53 | Mueller et al. | 251—163 |
| 2,719,022 | 9/55 | Blevans | 251—163 |
| 2,809,060 | 10/57 | Thompson | 251—306 XR |
| 2,820,605 | 1/58 | Dougherty | 251—307 XR |
| 2,934,084 | 4/60 | Adams | 137—527.4 |
| 2,936,778 | 5/60 | Stillwagon | 251—306 XR |

FOREIGN PATENTS 622,894  6/61  Canada.

M. CARY NELSON, *Primary Examiner.*